March 6, 1973  L. M. BURRAGE ETAL  3,719,581
APPARATUS FOR PRODUCING WET PROCESS CERAMIC BODIES
Original Filed Aug. 22, 1969  2 Sheets-Sheet 1

United States Patent Office 3,719,581
Patented Mar. 6, 1973

3,719,581
APPARATUS FOR PRODUCING WET PROCESS CERAMIC BODIES
Lawrence M. Burrage, South Milwaukee, and Darrel D. McStrack, New Berlin, Wis., assignors to McGraw-Edison Company, Milwaukee, Wis.
Continuation of abandoned application Ser. No. 852,399, Aug. 22, 1969. This application Feb. 25, 1972, Ser. No. 229,298
Int. Cl. B01d 13/02; B01k 5/00
U.S. Cl. 204—299
10 Claims

ABSTRACT OF THE DISCLOSURE

A filter press has a group of chambers for receiving ceramic slip under pressure. Each chamber has a pair of separated electrodes connected to a direct current source. The walls of the chambers have vertical grooves and are coated with an insulating material. A filtering material covers the electrodes.

Reference is hereby made to copending application, Ser. No. 852,399, "Apparatus and Method for Producing Wet Process Ceramic Bodies," Aug. 22, 1969, now abandoned for purposes of obtaining the benefit of the filing date in accordance with 35 U.S.C. 120.

This invention relates to an apparatus for treating ceramic slip to produce a ceramic filter cake, particularly to an apparatus for removing moisture by applying a direct electrical current and pressure to the ceramic slip.

Apparatus for treating ceramic materials is available commercially for screening, mixing, pressing, extruding, glazing and firing as well as for other specialized purposes. One of the problems in ceramic processing is the removal of moisture during the pressing in an effective controlled manner to obtain the uniform consistency and desired moisture content. With an apparatus according to this invention, moisture can be relatively easily and quickly removed, practically to any desired level, by the application of both an electrical current and pressure to the slip in a chamber having electrodes, a filtering and blocking material and draining passages for the removed water.

The objects and advantages of this invention will be apparent from the following detailed description.

Figure 1:
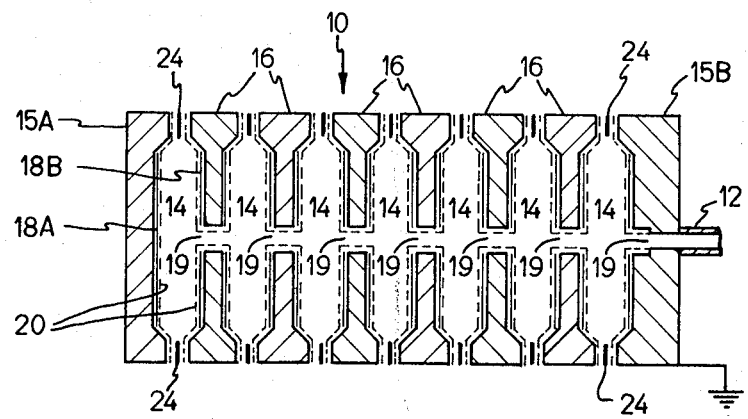
FIG. 1 is a simplified sectional side view of a multi-chamber filter press according to this invention.

Referring to FIG. 1, a filter press 10 comprises a group of press plates 16 and end plates 15A and 15B that are pressed or held together by any retaining means (not shown) to form sealed chambers 14. Press plates 16 and end plate 15B have an opening 19 for passing ceramic slip, and a receiving pipe 12 is connected to opening 19 in end plate 15B to receive the ceramic slip from a source and pump (not shown).

Figure 2:
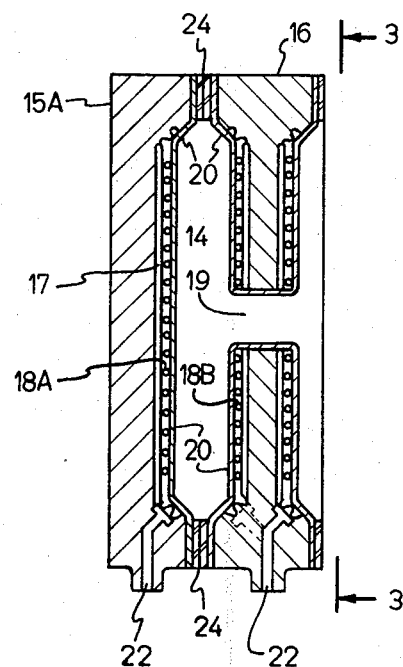
FIG. 2 is a more detailed view of a single chamber of a filter press as shown in FIG. 1.
Figure 3:
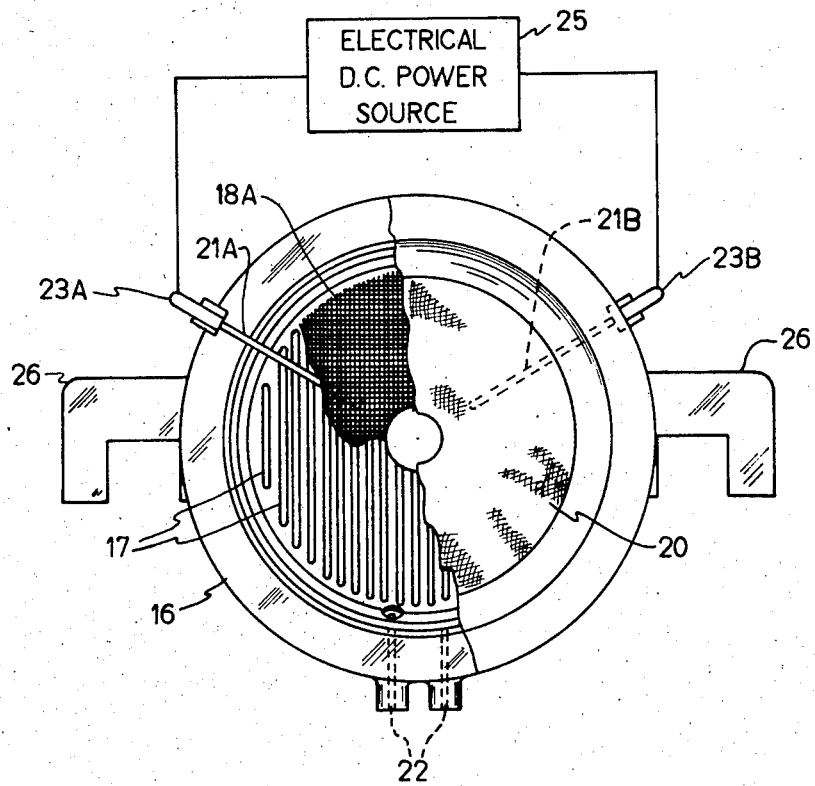
FIG. 3 is a simplified fragmentary sectional end view along line 3—3 of FIG. 2.

Also referring to FIGS. 2 and 3, the endmost chamber 14 adjacent end plate 15A is shown in more detail. When the plates are pressed together by the retaining means, chambers 14 are formed with each chamber having a drain 22, a pair of electrodes 18A and 18B, vertical grooves 17 formed in the sides of the plates, and a porous sack or cloth 20 placed adjacent the electrodes. An electrical direct current source 25 is connected to electrodes 18A and 18B by electrical terminals 23A and 23B through electrode tabs 21A and 21B, respectively.

Electrodes 18A and 18B are electrically conducting porous plates or screens and may be constructed of aluminum, copper or a galvanized screen, but a stainless steel screen is preferred because it is less subject to corrosion. Filter sacks 20 are preferably constructed of nylon, but other porous materials such as other polymers, cotton, paper and fiber glass are normally acceptable. Plates 15A, 15B and 16 may be made of iron with an epoxy coating to insulate adjacent plates from each other. To insure electrical insulation between plates, or to provide insulation in noncoated plates, insulating gaskets 24 are placed between the plates. Electrode tabs 21A and 21B are flat conductive pieces pressure connected to electrodes 18A and 18B, respectively, in each chamber and extending outwardly to electrical terminals 23A and 23B, respectively.

Referring particularly to FIG. 3, each plate has a pair of plate support arms 26 attached to opposite sides to provide support and alignment in a manner known in the art.

In operating the apparatus shown in FIG. 1 the ceramic slip is pumped into the filter press up to a selected pressure. A direct current is applied to the slip in each chamber. The operation is carried out until the water content is reduced to a desired level. A relatively low moisture content of less than fifteen percent is preferable for machining, while a higher moisture content of approximately eighteen percent is preferred for hot pressing. To enhance the moisture removal, known additives may be added to the slip to control the viscosity, pH, flocculation, electrical conductivity, and various other properties. The pressure source typically provides an operating pressure of approximately 180 to 250 p.s.i. The power supply is selected to produce potentials in the range of 40 to 150 volts per inch of cake thickness. The current requirement is dependent on plate area, number of plates, and the electrical conductivity of the material.

Figure 4:
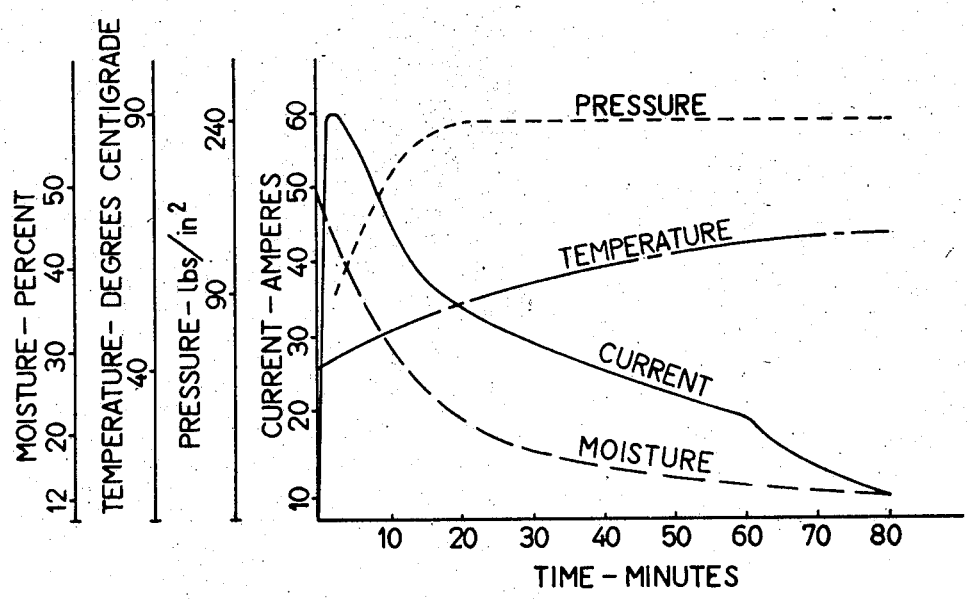
FIG. 4 is a graph of the relationship between certain test variables versus time in a typical operation of an apparatus according to this invention.

FIG. 4 shows a graphical representation of various characteristics occurring in a typical operation plotted with respect to time. It shows the decrease in the current with time as the moisture content in the slip is decreased. It has been found that the proper use of an apparatus according to this invention reduces the time in the filter press from two to three hours to ten to fifteen minutes, easily produces ceramic masses with as low as twelve percent moisture that are ideally suited for machining or hot pressing following an extrusion process, and produces ceramic masses and final porcelain products with the homogenous and isotropic characteristics desired for high quality ceramic products.

We claim:
1. A filter press for treating wet ceramic material comprising:
   a plurality of press plates adjacent each other shaped to form chambers between a portion of the sides of adjacent plates to contain the wet ceramic material, at least some of said press plates having an opening to provide a drain near the bottom of each chamber;
   a pair of spaced apart electrodes within each chamber, each adjacent opposite sides of the chamber formed by the portion of the side of the plates forming the chamber;
   an electrical direct current source connected to the electrodes with one electrode in each chamber connected to one polarity of said source and the other electrode connected to the other polarity;
   a porous material adjacent the electrodes on the chamber side of said electrodes, said material connected to enclose a space within the chamber to receive the wet ceramic material; and a means for electrically insulating press plates from each other.

2. A filter press according to claim 1 wherein said press plates have vertical grooves in the portion of the sides forming the chamber and said electrodes are adjacent said grooves.

3. A filter press according to claim 2 wherein said drain holes directly communicate at least in part with the vertical grooves.

4. A filter press according to claim 3 wherein said means for insulating comprises an epoxy coating on said press plates.

5. A filter press according to claim 4 wherein said current source has a capability of producing sufficient current to produce a potential of 40 to 150 volts across each inch of wet ceramic material.

6. A filter press according to claim 5 wherein said electrodes are stainless steel screens, each having a conductive tab adjacent and in electrical contact with said screen with said tab extending outside of the filter press to connect to the current source.

7. A filter press according to claim 1 wherein said means for insulating comprises an epoxy coating on said press plates.

8. A filter press according to claim 1 wherein said current source has a capability of producing sufficient current to produce a potential of 40 to 150 volts across each inch of wet ceramic material.

9. A filter press according to claim 1 wherein said electrodes are stainless steel screens, each having a conductive tab adjacent and in electrical contact with said screen with said tab extending outside of the filter press to connect to the current source.

10. A filter press according to claim 1 wherein said porous material is made of nylon.

References Cited

UNITED STATES PATENTS

| | | | |
|---|---|---|---|
| 670,350 | 3/1901 | Schwerin | 204—180 R |
| 723,928 | 3/1903 | Schwerin | 204—180 R |
| 3,479,281 | 11/1969 | Kikindai et al. | 210—44 |

FOREIGN PATENTS

| | | | |
|---|---|---|---|
| 3,888 | 4/1915 | Great Britain | 204—180 R |
| 135,222 | 6/1918 | Great Britain | 204—180 R |
| 145,045 | 3/1921 | Great Britain | 204—180 R |

JOHN H. MACK, Primary Examiner

A. C. PRESCOTT, Assistant Examiner

U.S. Cl. X.R.

204—180 R